United States Patent
Budurean et al.

(10) Patent No.: US 10,387,292 B2
(45) Date of Patent: *Aug. 20, 2019

(54) DETERMINING APPLICATION TEST RESULTS USING SCREENSHOT METADATA

(71) Applicant: Google LLC, Mountain View, CA (US)

(72) Inventors: Cristina Elena Budurean, Zurich (CH); Richard Michael Gaywood, London (GB); Dino Hughes, London (GB); Johannes Tonollo, London (GB); Philip James Adams, Mountain View, CA (US); Fergus Gerard Hurley, London (GB)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,636

(22) Filed: Feb. 21, 2018

(65) Prior Publication Data

US 2018/0267885 A1    Sep. 20, 2018

Related U.S. Application Data

(63) Continuation of application No. 15/462,547, filed on Mar. 17, 2017, now Pat. No. 9,934,129.

(51) Int. Cl.
*G06F 11/36* (2006.01)

(52) U.S. Cl.
CPC ...... *G06F 11/3664* (2013.01); *G06F 11/3668* (2013.01); *G06F 11/3688* (2013.01); *G06F 11/3692* (2013.01); *G06F 11/3672* (2013.01)

(58) Field of Classification Search
CPC .......................................... G06F 11/362–3696
(Continued)

(56) References Cited

U.S. PATENT DOCUMENTS 7,757,175 B2 *   7/2010   Miller ................ H04L 43/50
                                                    714/38.14
7,769,773 B1     8/2010   Doubek et al.
(Continued)

OTHER PUBLICATIONS

Scientific Papers, University of Latvia; vol. 787—Computer Science and Information Technologies. Efficiency Measurements of Self-Testing; Edgars Diebelis—University of Latvia, Raina blvd. 19, Riga, Latvia. Scientific Papers, University of Latvia, 2012. vol. 787 Computer Science and Information Technologies. (Applicant points out, in accordance with MPEP 609.04(a), that the year of publication, 2012, is sufficiently earlier than the effective U.S. filing date, 2018, so that the particular month of publication is not in issue.).

(Continued)

*Primary Examiner* — Francisco J Aponte
(74) *Attorney, Agent, or Firm* — Shumaker & Sieffert, P.A.

(57) ABSTRACT

A system generates screenshots of a graphical user interface (GUI) of an application that is displayed by target devices testing the application. Each screenshot includes an image of the GUI and metadata indicative of elements of the GUI present in the image or a state of the application or target device when the image is generated. The system determines, based on the metadata of a screenshot from a first set of the screenshots and the metadata of a screenshot from a second set of the screenshots, whether the screenshots are similar and if so, the system assigns the screenshot from the second set of screenshots to a cluster that includes the screenshot from the first set of screenshots. The system outputs an indication of the cluster (e.g., a notification or graphical indication) indicative of the similarity or discrepancy between the screenshots.

20 Claims, 3 Drawing Sheets

(58) Field of Classification Search
USPC .......................................................... 717/125
See application file for complete search history.

(56) References Cited

U.S. PATENT DOCUMENTS

| | | | |
|---|---|---|---|
| 7,870,504 B1 | 1/2011 | Mcintosh et al. | |
| 8,490,059 B2* | 7/2013 | Huang | H04L 67/02 717/125 |
| 8,498,473 B2 | 7/2013 | Chong et al. | |
| 8,682,083 B2 | 3/2014 | Kumar et al. | |
| 8,762,881 B2* | 6/2014 | Lawrance | G06F 11/3692 715/781 |
| 8,805,094 B2* | 8/2014 | Prasad | G06K 9/6263 382/159 |
| 8,938,683 B2* | 1/2015 | Bentrup | G06F 11/3664 715/760 |
| 8,990,774 B2 | 3/2015 | Amintafreshi | |
| 9,135,151 B2 | 9/2015 | Betak et al. | |
| 9,189,377 B1* | 11/2015 | Arkadyev | G06F 11/3688 |
| 9,208,054 B2 | 12/2015 | Prasad | |
| 9,213,625 B1 | 12/2015 | Schrage | |
| 9,298,598 B2 | 3/2016 | Fryc et al. | |
| 9,323,418 B2* | 4/2016 | DiVita | G06F 3/0481 |
| 9,348,727 B1 | 5/2016 | Cai et al. | |
| 9,529,699 B2 | 12/2016 | Rajan et al. | |
| 9,535,822 B1 | 1/2017 | Chau et al. | |
| 9,569,325 B2 | 2/2017 | Chen et al. | |
| 9,600,519 B2* | 3/2017 | Schoning | G06F 16/24 |
| 9,805,007 B2 | 10/2017 | Bentrup | |
| 9,836,385 B2 | 12/2017 | Malla | |
| 2003/0056150 A1 | 3/2003 | Dubovsky | |
| 2008/0229231 A1* | 9/2008 | Delia | G06F 17/30905 715/781 |
| 2008/0244381 A1 | 10/2008 | Nicolaou et al. | |
| 2011/0093773 A1* | 4/2011 | Yee | G06F 17/30896 715/235 |
| 2011/0173589 A1* | 7/2011 | Guttman | H04L 43/50 717/125 |
| 2011/0214107 A1* | 9/2011 | Barmeir | G06F 11/3684 717/125 |
| 2011/0276946 A1 | 11/2011 | Pletter | |
| 2011/0289489 A1* | 11/2011 | Kumar | G06F 11/3664 717/135 |
| 2012/0260327 A1* | 10/2012 | Lissick | H04L 63/08 726/9 |
| 2012/0311539 A1* | 12/2012 | Bullard | G06F 11/368 717/127 |
| 2013/0182949 A9 | 7/2013 | Pankratius | |
| 2014/0075344 A1 | 3/2014 | Bentrup | |
| 2014/0147051 A1 | 5/2014 | Kumar et al. | |
| 2014/0181705 A1 | 6/2014 | Hey et al. | |
| 2014/0189576 A1 | 7/2014 | Carmi | |
| 2014/0317602 A1 | 10/2014 | Zuo | |
| 2015/0161088 A1 | 6/2015 | Kamada | |
| 2015/0301926 A1 | 10/2015 | Giannelos | |
| 2015/0347276 A1 | 12/2015 | Hey et al. | |
| 2015/0347284 A1 | 12/2015 | Hey et al. | |
| 2017/0139812 A1 | 5/2017 | Cal et al. | |

OTHER PUBLICATIONS

Automated User Interface Testing for Web Applications and TestComplete; Samer Al-Zain and Derar Eleyan, Faculty of Information Technology, Birzeit University, Palestine; Joy Garfield, School of Technology, Wolverhampton University, Wolverhampton. CUBE 2012, Sep. 3-5, 2012, Pune, Maharashtra, India.

Associating the Visual Representation of User Interfaces with their Internal Structures and Metadata—UIST'11, Oct. 16-19, 2011, Santa Barbara, CA, USA; Tsung-Hsiang Chang, MIT CSAIL; Tom Yeh, University of Maryland; Rob Miller, MIT CSAIL. Paper Session: Development 2011.

U.S. Appl. No. 15/462,547, by Budurean et al., filed Mar. 17, 2017.

Prosecution History from U.S. Appl. No. 15/462,547, dated May 31, 2017 through Dec. 21, 2017, 87 pp.

* cited by examiner

DETERMINING APPLICATION TEST RESULTS USING SCREENSHOT METADATA

RELATED APPLICATION

This application is a continuation of U.S. patent application Ser. No. 15/462,547, filed Mar. 17, 2017, the entire contents of which are hereby incorporated by reference.

BACKGROUND

Before releasing an application to end users, a software developer or designer may test the application to understand how the application will appear and function when executed in an execution environment provided by a target device. Some such software testing may involve exercising the application, using a test system, in a variety of different execution environments provided by a variety of different target devices. That is, a test system may generate input to an application that simulates inputs (e.g., gesture inputs, text inputs, or other inputs) that may be provided by a user. The test system may use actual production devices that are flashed or otherwise loaded with tester-defined software and/or firmware configurations thereby enabling testing of the application across a broad range of devices and device configurations that may be used by different end users.

A test system may output, as test results, screenshots of a graphical user interface (GUI) that an application causes to be displayed on a target device during application testing. The test system may output a set of screenshots for each execution environment in which the application is exercised and each set of screenshots may have a large quantity of images. A software developer or designer may analyze the screenshots across the different sets to identify issues, anomalies, or otherwise understand how the appearance of the GUI may change according to changes in execution environments and/or target devices at which the GUI is displayed. Some software developers or designers may be burdened with the overwhelming task of manually sifting through multiple sets of screenshots to validate an application's design and operation.

SUMMARY

In general techniques of this disclosure are directed to enabling an application test system to identify, and cluster, similar screenshots generated during an automated test of an application even if the application test system executes the automated test across a broad range of different target devices and/or in a variety of different execution environments. The application test system may group similar screenshots based on certain structural thresholds for similarity as opposed to grouping screenshots according to specific image features. That is, the application test system uses metadata associated with the screenshots, as opposed to analyzing image data of the screenshots, to cluster or group similar screens.

A screenshot generated during an automated test of an application may include an image (e.g., pixel information) of an application graphical user interface (GUI) being displayed on a display screen of a target device while the target device executes the application during the automated test. The screenshot may further include metadata indicative of the structural elements that make up the GUI in the image. The metadata may define one or more GUI elements (e.g., a layout, a button, a background, a drawer or sidebar, or another component of the GUI), and corresponding elemental characteristics, that are visible on the display screen of the target device and in the GUI, when the screenshot is generated. In addition, or alternatively, the metadata may define a state of the target device (e.g., device type, orientation, locale, time, test execution, and any other parameters or characteristics of the target device or application) at a time when the screenshot is generated.

To reduce the burden of otherwise having to sift through multiple sets of screenshots generated from an application test to validate an application's design and operation, the example test system may automatically group screenshots from among the different sets into clusters of similar screenshots. A cluster may include screenshots that share similar elemental structures as defined by the metadata of the screenshots, as opposed to necessarily sharing common image features. In other words, a cluster may include screenshots of a GUI that is defined, in the metadata of the screenshots, by a particular elemental structure, even though (after having been captured in a different execution environment or from a display screen of a different target device) some of the GUI elements may not be common across all screenshots in the cluster. The application test system may output a graphical indication of the clusters (e.g., via an application test GUI) from which a user of the application test system, can more easily and quickly evaluate an application's performance. A user of the example test system can focus on the screenshots in a particular cluster to understand how the appearance of the GUI may change according to changes in execution environments and/or target devices at which the GUI is displayed.

By clustering according to elemental structures defined in the metadata of a screenshot, as opposed to clustering according to image features (e.g., pixel information), the application test system may be able to quickly and efficiently identify similar looking screenshots even if, due to variability in execution environment and/or target device characteristics, the screenshots are not identical. For example, what may be a seemingly impossible task for some other systems that perform pixel-based image feature analysis, the application test system may be able to identify, using only metadata, two or more similar screenshots: taken from different sizes screens (e.g. a mobile phone as compared to a tablet computing device), taken from different execution environments (e.g. different operating systems, different versions of the same operating system, etc.), including GUI elements that are aligned differently (e.g., because of region and/or language differences), having different randomized content (e.g. different background images, different advertisements, etc.), having different text (e.g. show different times or calendar days, different languages, etc.), have lists of different lengths, etc.

Accordingly, the example application test system may be able to quickly and efficiently perform complex clustering of similar, but not necessarily identical, GUI screenshots thereby aiding a user of the application test system to more quickly and easily validate an application's design and operation after conducting an automated test. Clustering of screenshots in this way may be difficult, if not impossible, using traditional image analysis techniques that focus on identifying similar image features, as opposed identifying similar elemental structures.

In one example, the disclosure is directed to a method that includes generating, in response to a first test of an application, a first set of screenshots of a graphical user interface of the application while the graphical user interface is displayed by a first target device during the first test, and generating, in response to a second test of the application, a second set of screenshots of the graphical user interface while the graphical user interface is displayed by a second target device during the second test. Each screenshot from the first set of screenshots and each screenshot from the second set of screenshots includes a respective image of the graphical user interface and respective metadata indicative of at least one of one or more elements of the graphical user interface that are present in the respective image or a state of the application or respective target device when the respective image is generated. The method further includes determining, based on the respective metadata of a screenshot from the first set of screenshots and the respective metadata of a screenshot from the second set of screenshots, whether the screenshot from the first set of screenshots and the screenshot from the second set of screenshots are similar, and responsive to determining that the first set of screenshots and the screenshot from the second set of screenshots are similar: assigning the screenshot from the second set of screenshots to a cluster that includes the screenshot from the first set of screenshots, and outputting, for display, a graphical indication of the cluster including a portion of the respective image of the screenshot from the second set of screenshots.

In one example, the disclosure is directed to a system that includes means for generating, in response to a first test of an application, a first set of screenshots of a graphical user interface of the application while the graphical user interface is displayed by a first target device during the first test, and means for generating, in response to a second test of the application, a second set of screenshots of the graphical user interface while the graphical user interface is displayed by a second target device during the second test. Each screenshot from the first set of screenshots and each screenshot from the second set of screenshots includes a respective image of the graphical user interface and respective metadata indicative of at least one of one or more elements of the graphical user interface that are present in the respective image or a state of the application or respective target device when the respective image is generated. The system further includes means for determining, based on the respective metadata of a screenshot from the first set of screenshots and the respective metadata of a screenshot from the second set of screenshots, whether the screenshot from the first set of screenshots and the screenshot from the second set of screenshots are similar, and responsive to determining that the first set of screenshots and the screenshot from the second set of screenshots are similar: means for assigning the screenshot from the second set of screenshots to a cluster that includes the screenshot from the first set of screenshots, and means for outputting, for display, a graphical indication of the cluster including a portion of the respective image of the screenshot from the second set of screenshots.

In one example, the disclosure is directed to computing system that includes at least one processor configured to receive a request to test an application, generate, in response to a first test of the application following the request, a first set of screenshots of a graphical user interface of the application while the graphical user interface is displayed by a first target device during the first test, and generate, in response to a second test of the application following the request, a second set of screenshots of the graphical user interface while the graphical user interface is displayed by a second target device during the second test. Each screenshot from the first set of screenshots and each screenshot from the second set of screenshots includes a respective image of the graphical user interface and respective metadata indicative of at least one of one or more elements of the graphical user interface that are present in the respective image or a state of the application or respective target device when the respective image is generated. The at least one processor is further configured to determine, based on the respective metadata of a screenshot from the first set of screenshots and the respective metadata of a screenshot from the second set of screenshots, whether the screenshot from the first set of screenshots and the screenshot from the second set of screenshots are similar, and responsive to determining that the first set of screenshots and the screenshot from the second set of screenshots are similar: assign the screenshot from the second set of screenshots to a cluster that includes the screenshot from the first set of screenshots, and output, for display, a graphical indication of the cluster including a portion of the respective image of the screenshot from the second set of screenshots.

In one example, the disclosure is directed to a computer-readable storage medium comprising instructions that, when executed, cause at least one processor of a computing system to: generate, in response to a first test of an application, a first set of screenshots of a graphical user interface of the application while the graphical user interface is displayed by a first target device during the first test, and generate, in response to a second test of the application, a second set of screenshots of the graphical user interface while the graphical user interface is displayed by a second target device during the second test. Each screenshot from the first set of screenshots and each screenshot from the second set of screenshots includes a respective image of the graphical user interface and respective metadata indicative of at least one of one or more elements of the graphical user interface that are present in the respective image or a state of the application or respective target device when the respective image is generated. The instructions, when executed, further cause the at least one processor to determine, based on the respective metadata of a screenshot from the first set of screenshots and the respective metadata of a screenshot from the second set of screenshots, whether the screenshot from the first set of screenshots and the screenshot from the second set of screenshots are similar, and responsive to determining that the first set of screenshots and the screenshot from the second set of screenshots are similar: assign the screenshot from the second set of screenshots to a cluster that includes the screenshot from the first set of screenshots, and output, for display, a graphical indication of the cluster including a portion of the respective image of the screenshot from the second set of screenshots.

The details of one or more examples are set forth in the accompanying drawings and the description below. Other features, objects, and advantages of the disclosure will be apparent from the description and drawings, and from the claims.

DETAILED DESCRIPTION

Figure 1:
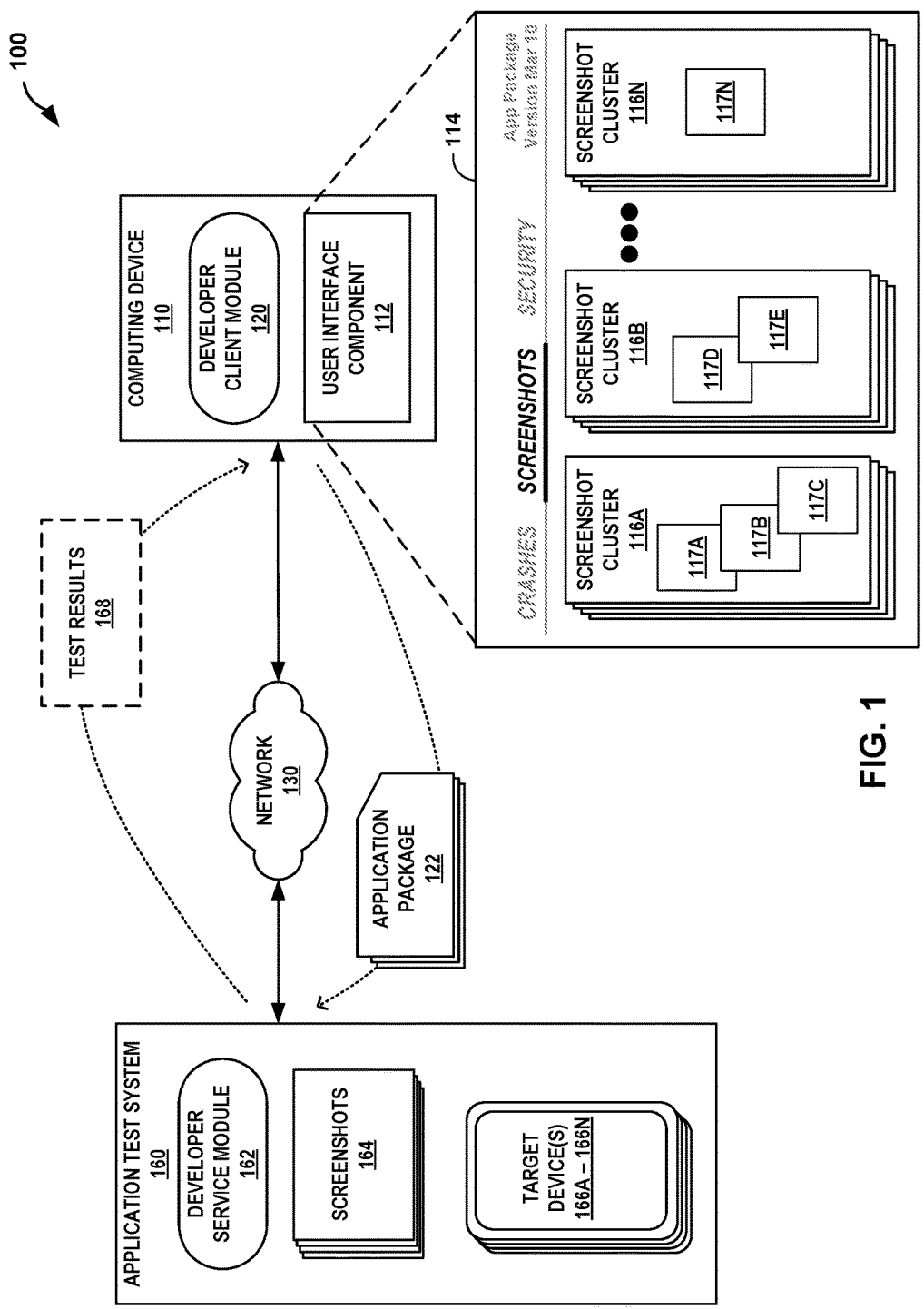
FIG. 1 is a conceptual diagram illustrating an example computing system configured to identify and cluster similar screenshots generated during an application test, in accordance with one or more aspects of the present disclosure.

FIG. 1 is a conceptual diagram illustrating an example computing system configured to identify and cluster similar screenshots generated during an application test, in accordance with one or more aspects of the present disclosure. System 100 includes application test system ("ATS") 160 in communication, via network 130, and computing device 110. Although shown as being separate devices or computing systems, ATS 160 and computing device 110 may a single computing system that performs the operations attributed to system 100. ATS 160 includes developer service module 162, screenshots 164, and one or more target devices 166A-166N (collectively "test target devices 166"). Computing device 110 includes user interface component ("UIC") 112 and developer client module 120.

Network 130 represents any public or private communications network, for instance, cellular, Wi-Fi, and/or other types of networks, for transmitting data between computing systems, servers, and computing devices. Network 130 may include one or more network hubs, network switches, network routers, or any other network equipment, that are operatively inter-coupled thereby providing for the exchange of information between ATS 160 and computing device 110. ATS 160 and computing device 110 may transmit and receive data across network 130 using any suitable communication techniques.

ATS 160 and computing device 110 may each be operatively coupled to network 130 using respective network links. The links coupling ATS 160 and computing device 110 to network 130 may be Ethernet, ATM or other types of network connections, and such connections may be wireless and/or wired connections.

ATS 160 represents any suitable computing system or systems (e.g., one or more desktop computers, one or more laptop computers, one or more mainframes, one or more servers, one or more cloud computing systems, or one or more other types of remote computing systems) capable of exchanging information via network 130 as part of an application testing service. That is, ATS 160 may receive application packages (e.g., application package 122) via network 130, and exercise the application package in a variety of different execution environments provided by a variety of different target devices, such as target devices 166. ATS 160 may generate screenshots, such as screenshots 164, during a or in response to a test, and output the screenshots as test results (e.g., test results 168) via network 130.

Application package 122 represents machine-readable, executable code configured to operate at an application layer of an operating system. A processor may execute application package 122. For example ATS 160 may cause target devices 166 to execute application package 122 during a test. Target devices 166 may display a GUI defined by application package 122, and the GUI may change in response inputs provided by ATS 160 to application package 122, while executing at target devices 166, during the test.

Target devices 166 represent a combination of virtual and physical production devices that are flashed with, or otherwise configured to execute, tester-defined software and/or firmware configurations thereby enabling ATS 160 to perform testing of an application package across a broad range of devices and device configurations that may be used by different end users. Examples of target devices 166 include mobile phones, tablet computers, laptop computers, desktop computers, servers, mainframes, televisions, wearable devices (e.g., computerized watches etc.), home automation devices, assistant devices, gaming systems, media players, e-book readers, mobile television platforms, automobile navigation or infotainment systems, or any other type of mobile, non-mobile, wearable, and non-wearable computing device configured to execute and display a GUI of, an application package being tested by ATS 160.

Developer service module 162 may provide the interface between ATS 160 and client devices, such as computing device 110, that access the service provided by ATS 160. Developer service module 162 is configured to receive an application package for a test, causes target devices 166 to execute the application package as part of conducting the test, and package and output results of the test via network 130. Module 162 may perform operations described herein using software, hardware, firmware, or a mixture of hardware, software, and firmware residing in and/or executing at ATS 160. ATS 160 may execute module 162 with multiple processors or multiple devices, as virtual machines executing on underlying hardware, as one or more services of an operating system or computing platform, and/or as one or more executable programs at an application layer of a computing platform of ATS 160.

Computing device 110 represents any suitable computing device or system (e.g., one or more desktop computers, one or more laptop computers, mobile devices, or any other type of computing device) capable of exchanging information via network 130 to access application testing service provided by ATS 160. That is, computing device 110 may be a software developer or designer workstation configured to send application packages (e.g., application package 122) via network 130 to ATS 160 and request that ATS 160 execute the application package in a variety of different execution environments provided by a variety of different target devices, such as target devices 166. Computing device 110 may be further configured to receive, from ATS 160 via network 130, test results, such as test results 168 and screenshots 164, generated by ATS 160 during or in response to an application test.

Developer client module 120 may provide the interface between computing device 110 and ATS 160. For example, developer client module 120 may be a stand-alone application executing at computing device 110 and/or execute within an internet browser (e.g., as an internet application) executing at computing device 110 and send information to and receive information from ATS 160. Developer client module 120 is configured to send, to ATS 160 via network 130, an application package (e.g., application package 122) to be tested, and receive, from ATS 160 via network 130, results (e.g., test results 168) of the test. Module 120 may perform operations described herein using software, hardware, firmware, or a mixture of hardware, software, and firmware residing in and/or executing at computing device 110. Computing device 110 may execute module 120 with multiple processors or multiple devices, as virtual machines executing on underlying hardware, as one or more services of an operating system or computing platform, and/or as one or more executable programs at an application layer of a computing platform of computing device 110.

UIC 112 of computing device 110 may function as an input and/or output device for computing device 110. UIC 112 may be implemented using various technologies. For instance, UIC 112 may function as an input device using presence-sensitive input screens, microphone technologies, infrared sensor technologies, or other input device technology for use in receiving user input. UIC 112 may function as output device configured to present output to a user using any one or more display devices, speaker technologies, haptic feedback technologies, or other output device technology for use in outputting information to a user.

Developer client module 120 may cause UIC 112 to output a GUI associated with the application testing service provided by ATS 160. For example, as shown in FIG. 1, developer client module 120 may send instructions to UIC 112 that cause UIC 112 to display GUI 114 at a display screen of UIC 112. GUI 114 includes graphical indications of screenshot clusters 116-116N (collectively "clusters 116").

Each of the graphical indications of screenshot clusters 116 includes at least a portion of one or more screenshot images included in that cluster. For example, screenshot cluster 116A includes at least a portion of images 117A, 117B, and 117C. Screenshot cluster 116B includes at least a portion of images 117D and 117E. And screenshot cluster 116N includes at least a portion of image 117N.

As is described in greater detail below, each of clusters 116 includes one or more screenshots 164 that have similar elemental structures as defined by the metadata of the one or more screenshots 164. In this way, the screenshots 164 of each of clusters 116 may relate to a common feature of the application being tested during a particular part of an application test. The screenshots 164 in each cluster 116 maybe taken at different target devices 166 or in different execution environments (e.g., at a single one of target devices 166 but with different software, hardware, or firmware configurations for each part of the test) during execution of the application test. In other words, a cluster 116 may include screenshots 164 that share similar GUI elements even though each of screenshots 164 may include different image features, having been captured in a different execution environment or from a display screen of a different one of target devices 166.

In operation, a user of computing device 110 (e.g., software developer or designer of application package 122) may wish to understand how a GUI associated with application package 122 appears and functions when displayed in a variety of different execution environments provided by a variety of different target devices. The user may provide input at a presence-sensitive screen of UIC 112 at or near a location of UIC at which GUI 114 is displayed. UIC 112 may provide information about the input to developer client module 120 and in response to the information about the input, developer client module 120 may initiate a test of application package 122 utilizing the testing service provided by ATS 160.

Developer client module 120 may send, to ATS 160 via network 130, an indication of application package 122 (e.g., actual data that includes application package 122 or a location in memory of computing device 110 at which the data that includes application package is stored) with a request to have application package 122 tested. The request may specify requirements of the test, including, but not limited to: the types of devices (e.g., hardware, software, and firmware configurations) to be utilized in the test, a duration of the test, a complexity of the test, a particular benchmark or testing protocol, or any and all other test requirements.

Developer service module 162 of ATS 160 may receive the indication of application package 122 and the request. In response to the request, developer service module 162 may configure target devices 166 to execute a test of application package 122 according to the requirements specified by the request.

Developer service module 162 may cause test target devices 166 to execute the test of application package 122. During the test, developer service module 162 may take and store screenshots 164 of the GUI of application package 122 being displayed by each of target devices 166 that is executing the test. For example, developer service module 162 may provide input to target device 166A that causes target device 166A to record and store as one or more screenshots 164, a first set of screenshots of the GUI of application package 122 while the GUI is displayed by target device 166A during the test, developer service module 162 may provide input to target device 166N that causes target device 166N to record and store as one or more screenshots 164, a second set of screenshots of the GUI of application package 122 while the GUI is displayed by target device 166N during the test, and so forth.

Each of screenshots 164 that is stored at ATS 160 may include an image (e.g., pixel information) of the GUI being displayed on a display screen of one of target devices 166 while that particular target device from target devices 166 executes an application during the automated test and further include metadata (e.g., non-pixel information) indicative of one or more elements of the GUI (e.g., a layout, a button, a background, a drawer or sidebar, or another component of the GUI), and characteristics of the one or more elements of the GUI, that are present in the image. In addition, or alternatively, the metadata may define a state of the target device 166 (e.g., device type, orientation, locale, time, test execution, and any other parameters or characteristics of the target device or application) at a time when the screenshot 164 is made. For example, the metadata of one of screenshots 164 may include information about a graphical button of a GUI as well as the size, position, location, color, label, or other information about the graphical button. In some examples, the metadata of one of screenshots 164 may include information about the screen orientation, size, application state, or other information about the target device or application when that particular screenshot 164 was made.

To reduce the burden of otherwise having to sift through multiple sets of screenshots 164 generated from a single automated test that has been executed across a broad range of different target devices 166 and/or in a variety of different execution environments, ATS 160 may automatically group screenshots 164 into clusters 116 before sharing test results 168 with developer client module 120. ATS 160 may identify screenshots 164 taken during the test of application package 122 that have images of GUIs with similar elemental structures but not necessarily similar image features. Rather than perform computationally intensive image analysis techniques on the raw images (e.g., pixel information) of each of screenshots 164 to identify similar screenshots, ATS 160 may traverse screenshot metadata (i.e., non-pixel data) of each of screenshots 164 to identify screenshots 164 that share common GUI features.

Developer service module 162 may determine, based on the metadata of a first screenshot from the first set of screenshots 164 taken by target device 166A and the metadata of each screenshot from the second set of screenshots 164 taken by target device 166N, a second screenshot from the second set of screenshots 164 taken by target device 166N that shares a similarity score with the first screenshot taken by target device 166A that is greater than similarity scores shared between the first screenshot taken by target device 166A and any other screenshot from the second set of screenshots taken by target device 166N. Said differently, developer service module 162 may determine similarity scores between the metadata of screenshots 164 taken by target device 166A and the metadata of screenshots 164 taken by target device 166N. If the highest similarity score between a particular one of screenshots 164 taken by target device 166A and any of the screenshots 164 taken by target device 166N satisfies a score threshold, developer service module 162 may cluster the two of screenshots 164 that are associated with the highest similarity score. If, however, the highest similarity score between one of the screenshots 164 taken by target device 166A and any of the screenshots 164 taken by target device 166N does not satisfy the score threshold, developer service module 162 may create a new cluster for that particular one of screenshots 164 that was taken by target device 166A.

The screenshot metadata traversed by developer service module 162 may be organized as a tree structure or other type of hierarchal data structure so as to enable developer service module 162 to quickly compare the metadata between two or more screenshots 164 to determine what differences there are if any. For example, using tree comparison techniques, developer service module 162 may determine whether the metadata of two screenshots 164 is isomorphic, and if not, what the differences between the two metadata tree structures are. Developer service module 162 may determine a percentage of the screenshot occupied by the extra elements that are not shared between the metadata of the two screenshots 164. If the percentage of screen area occupied by the extra elements is less than an area threshold, developer service module 162 may apply a similarity function to the metadata of the two screenshots 164 and return a similarity score. Otherwise, the two screenshots 164 may determine that the two screens are not compatible and therefore not worth bothering with a similarity score.

Developer service module 162 may determine whether the similarity score satisfies a similarity threshold. For example, developer service module 162 may determine whether the particular one of screenshots 164 taken by test target device 166N that is most similar, out of all the screenshots 164 taken by test target device 166N, to the screenshot taken by test target device 166A, is sufficiently similar to cause developer service module 162 to cluster the two screenshots 164. Responsive to determining that the similarity score satisfies the similarity threshold, developer service module 162 may assign the second screenshot to a cluster that includes the first screenshot. And, responsive to determining that the similarity score does not satisfy the similarity threshold, developer service module 162 may create a new cluster that includes the second screenshot.

Other clustering techniques may be used by developer service module 162 to cluster similar screenshots taken by different test target devices 166. For example, developer service module 162 may apply hamming distance techniques to metadata associated with screenshots taken by test target device 166A and test target device 166N. Developer service module 162 may determine a hamming distance between two sets of metadata associated with screenshots taken by test target devices 166A and 166N and determine that the similar screenshots are those with the smallest hamming distance between them. Other clustering techniques may be used as well. In short, developer service module 162 takes metadata from screenshots 164 as input, and applies clustering techniques to the metadata to generate as output, clusters or groupings of screenshots 164 taken between different target test devices 166.

Developer service module 162 may share test results 168 with developer client module 120 at the conclusion of the test. Test results 168 may include information about screenshots 164 and clusters 116.

Developer client module 120, in response to receiving test results 168, may cause UIC 112 to output GUI 114. That is, developer client module 120 may cause UIC 112 to output, for display a graphical indication of clusters 116 including a portion of one or more images of the screenshots 164 included in that cluster. For example, developer client module 120 may cause UIC 112 to display a graphical indication of screenshot cluster 116A including at least a portion of images 117A, 117B, and 117C, a graphical indication of screenshot cluster 116B includes at least a portion of images 117D and 117E, and a graphical indication of screenshot cluster 116N including at least a portion of image 117N.

In this way, the application test system that operates in accordance to the described techniques may output a graphical indication of the clusters (e.g., via an application test GUI) from which a software developer, designer, or other user of the application test system, can more easily and quickly evaluate how the appearance of the application GUI changes when the application executes in different execution environments and/or at different target devices.

By analyzing the metadata, as opposed to analyzing image features or the pixel information, of screenshots, the application test system may be able to identify similar looking screenshots even if, due to variability in execution environment and/or target device characteristics, the screenshots are not identical. For example, what may be a seemingly impossible task for some other systems that perform raw or pixel-based image analysis, the application test system may be able to identify, using only metadata, two or more similar screenshots: taken from different sizes screens (e.g. a mobile phone as compared to a tablet computing device), taken from different execution environments (e.g. different operating systems, different versions of the same operating system, etc.), including GUI elements that are aligned differently (e.g., because of region and/or language differences), having different randomized content (e.g. different background images, different advertisements, etc.), having different text (e.g. show different times or calendar days, different languages, etc.), have lists of different lengths, etc. Accordingly, the example application test system may not only be able to cluster or otherwise group screenshots taken from an automated application test, even in cases where such a clustering is very difficult using traditional image analysis techniques, the example application test system may further be able to cluster screenshots quickly and efficiently thereby aiding a user of the application test system to more quickly and easily validate an application's design and operation after conducting an automated test.

Figure 2:
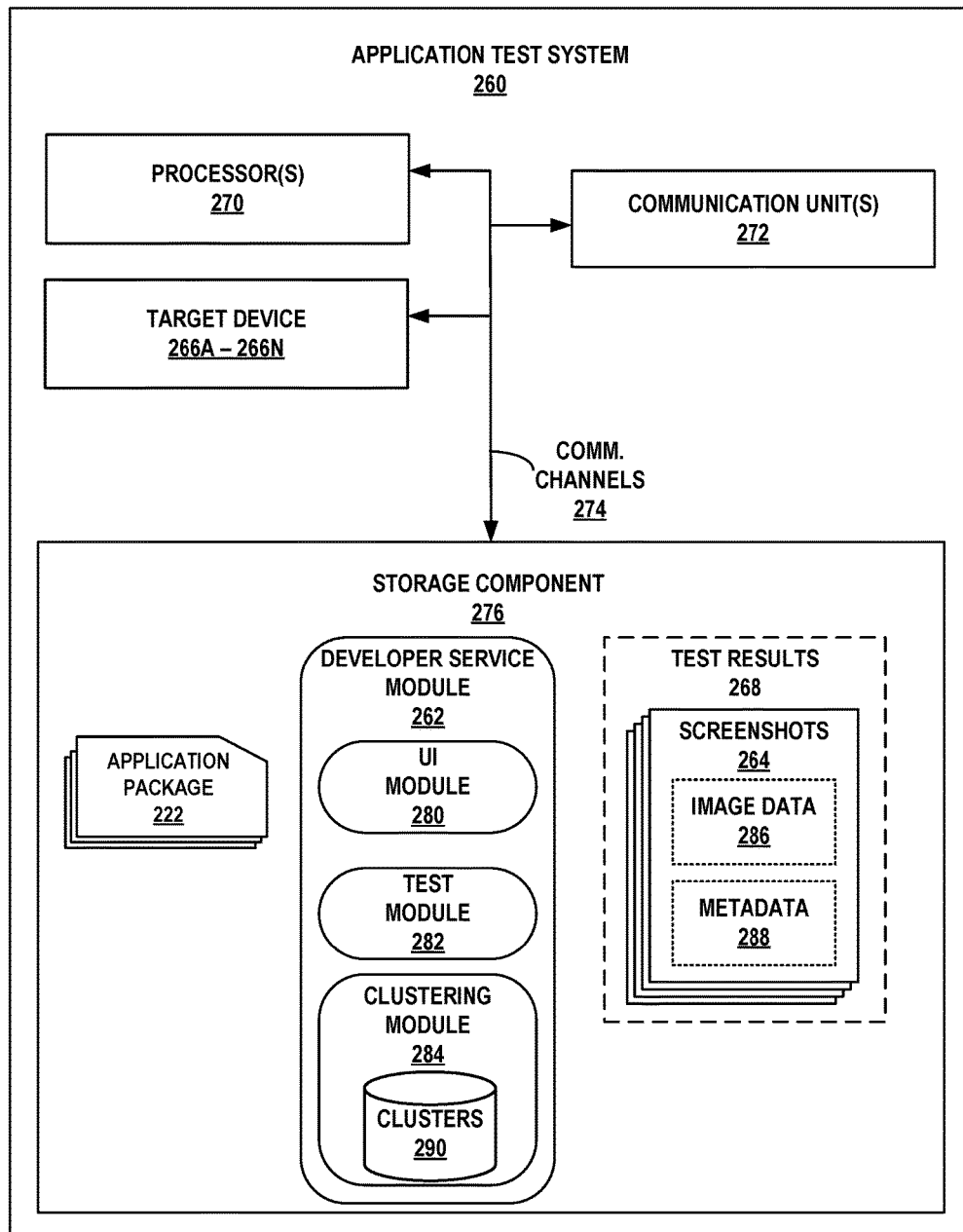
FIG. 2 is a block diagram illustrating an example computing system configured to identify and cluster similar screenshots generated during an application test, in accordance with one or more aspects of the present disclosure.

FIG. 2 is a block diagram illustrating an example computing system configured to identify and cluster similar screenshots generated during an application test, in accordance with one or more aspects of the present disclosure. Application test system (ATS) 260 of FIG. 2 is described below as an example of ATS 160 of FIG. 1. FIG. 2 illustrates only one particular example of ATS 260, and many other examples of ATS 260 may be used in other instances and may include a subset of the components included in example ATS 260 or may include additional components not shown in FIG. 2.

As shown in the example of FIG. 2, ATS 260 includes one or more processors 270, one or more communication units 272, one or more target devices 266A-266N (collectively "target devices 266"), and one or more storage components 276 communicatively coupled via communication channel 274. Storage components 276 includes application package 222, developer service module 262, and test results 268.

Developer service module 262 includes UI module 280, test module 282, and clustering module 284. Clustering module 284 includes clusters 290. Test results 268 includes screenshots 264. Screenshots 264 include image data 286 and metadata 288.

Communication channels 274 may interconnect each of the components 266, 270, 272, and 276 for inter-component communications (physically, communicatively, and/or operatively). In some examples, communication channels 274 may include a system bus, a network connection, an inter-process communication data structure, or any other method for communicating data.

One or more communication units 272 of ATS 260 may communicate with external devices via one or more wired and/or wireless networks by transmitting and/or receiving network signals on the one or more networks. Examples of communication units 272 include a network interface card (e.g. such as an Ethernet card), an optical transceiver, a radio frequency transceiver, a GPS receiver, or any other type of device that can send and/or receive information. Other examples of communication units 272 may include short wave radios, cellular data radios, wireless network radios, as well as universal serial bus (USB) controllers.

One or more storage components 276 within ATS 260 may store information for processing during operation of ATS 260 (e.g., ATS 260 may store data accessed by modules 270, 274, 276, and 278, and data stores 272 and 273 during execution at ATS 260). In some examples, storage component 276 is a temporary memory, meaning that a primary purpose of storage component 276 is not long-term storage. Storage components 276 on ATS 260 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 276, in some examples, also include one or more computer-readable storage media. Storage components 276 in some examples include one or more non-transitory computer-readable storage mediums. Storage components 276 may be configured to store larger amounts of information than typically stored by volatile memory. Storage components 276 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 276 may store program instructions and/or information (e.g., data) associated with modules 262, 280, 282, and 284, test results 268, and application package 222. Storage components 276 may include a memory configured to store data or other information associated with modules 262, 280, 282, and 284, test results 268, and application package 222.

One or more processors 270 may implement functionality and/or execute instructions associated with ATS 260. Examples of processors 270 include application processors, display controllers, graphics processors, auxiliary processors, one or more sensor hubs, and any other hardware configure to function as a processor, a processing unit, or a processing device. Modules 262, 280, 282, and 284 may be operable by processors 270 to perform various actions, operations, or functions of ATS 260. For example, processors 270 of ATS 260 may retrieve and execute instructions stored by storage components 276 that cause processors 270 to perform the operations modules 262, 280, 282, and 284. The instructions, when executed by processors 270, may cause ATS 260 to store information within storage components 276.

Target devices 266 may be similar to target devices 166 of FIG. 1. Target devices 266 may be physically part of ATS 260 or may be operatively coupled to, but separate physically, from ATS 260. Target devices 266 may include a "test farm" of test devices.

Developer service module 262 may include all functionality of developer service module 162 of ATS 160 of FIG. 1 and client service module 120 of computing device 110 of FIG. 1 and may perform similar operations as modules 162 and 120 for providing an application test service that automatically clusters screenshots generated from the test using metadata from the screenshots. That is, developer service module 262 may execute a test of application package 222 at various target devices 266, store results of the test as test results 268 including screenshots 264 taken during the test, and may further cluster screenshots 264 based on an analysis of metadata 288 for each of screenshots 264.

UI module 280 may provide a user interface associated with the application test service provided by developer service module 262. For example, UI module 280 may host a web interface from which a client, such as computing device 110, can access the service provided by developer service module 262 through a web browser or other application (e.g., developer client module 120) executing at or accessible from computing device 110. UI module 280 may send information to a client that causes the client to display a user interface, such as GUI 114 of FIG. 1, including graphical indications of clusters of screenshots 264 generated during a test.

Test module 282 may configure and cause target devices 266 to execute an application test. That is, test module 282 may interpret requests received by UI module 280 for initiating an application test. Test module 282 may receive such a request that specifies requirements of the test. Test module 282 may configure, based on the requirements of the test, some or all of target devices 266 to execute the test. For example, test module 282 may configure the software, hardware, and/or firmware of each of target devices 266 so that when executed, the requirements of the test are satisfied.

Test module 282 may flash target devices with specific software and firmware loads specified by the request. Test module 282 may install, and cause target devices 266 to execute an application package received with a request, such as application package 222. During the test, test module 282 may provide inputs to target devices 266 that cause target devices to take and store at storage component 276, screenshots 264 of the GUI of an application package being displayed by each of target devices 266 that is executing the test. Test module 282 may cause each screenshot stored as screenshots 264 to include both image data 286 and metadata 288. Test module 282 may cause target devices 266 to generate multiple sets of screenshots 264 during a test, with each set of screenshots 264 recording the appearance the application GUI for a particular execution environment and/or a particular target device 266 executing the application during the automated test.

Image data 286 represents an image (e.g., pixel information) of an application GUI being displayed on a display screen of one of target devices 266 while that target device executes an application during an automated test. Metadata 288 represents information indicative of the structural elements that make up the GUI in image data 286. Metadata 288 may define one or more GUI elements (e.g., a layout, a button, a background, a drawer or sidebar, or another component of the GUI), and corresponding elemental characteristics, that are visible on a display screen of one of target devices 266 and in the GUI, when the screenshot is made.

Metadata 288 may include a screen identifier that indicates a device type identifier concatenated with a device configuration identifier (e.g., device name, operating system version, locale, etc.). Metadata 288 may further include an element identifier for each GUI element present on a device screen, when a particular screenshot 264 was taken. The element identifier for each GUI element may be based on a class name, resource identifier, and sequence associated with that particular GUI element. The element identifier may be created by mapping each layer in the sequence with the corresponding resource id and class name, thereby resulting in a more specific way of identifying the GUI elements in a way that enables cluster module 284 to compare GUI elements across device configurations.

Clustering module 284 may automatically group screenshots 264 into clusters before UI module 280 shares test results 268 with users or client devices that access the application testing service provided by ATS 260. By clustering screenshots 264, clustering module 284 may improve the usability of the application testing service, enabling browsing or sorting through a finite set of clusters, as opposed to having to browse or sort through a large quantity of individual screenshots 264 generated from a single automated test that has been executed across a broad range of different target devices 266 and/or in a variety of different execution environments.

Clustering module 284 may identify, based on metadata 288, a set of screenshots 264 taken during a test of an application package, such as application package 222, that have images of GUIs with similar elemental structures but not necessarily similar image features. For example, clustering module 284 may compare the screen and element identifiers found in metadata 288 of different screenshots 264 to determine whether the respective element identifiers of any of screenshots 264 are similar.

Clustering module 284 may receive screenshots 264 as input and output a list of clusters that clustering module 284 stores as clusters 290. For each cluster stored as one of clusters 290, clustering module 284 may include one or more screenshots 264 assigned to that particular cluster. A first layer of a cluster of clusters 290 may include an indication (e.g., a pointer) of a particular one of screenshots 264 that represent the cluster. A second layer of a cluster of clusters 290 may include an indication of particular one of screenshots 264 per different target device 266 used in a test and/or per different device configuration. A third layer of a cluster of clusters 290 may include an indication of each of screenshots 264 that is included in the cluster.

Clustering module 284 may create clusters 290 incrementally, starting from an empty set of clusters 290. Each of screenshots 264 may either be matched to an existing one of clusters 290 or clustering module 284 may create a new cluster within clusters 290 for the unmatched one of screenshots 264. Clustering module 284 may determine a similarity score for each of screenshots 264 and each existing cluster stored at clusters 290. Clustering module 284 may add each screenshot to the one of clusters 290 with which the screenshot shares the highest similarity score, so long as the highest similarity score satisfies above a minimum scoring threshold. If the highest similarity score does not satisfy the minimum scoring threshold, clustering module 284 may treat that screenshot as an unmatched screenshot and create a new cluster within clusters 290 that includes the unmatched screenshot. When adding a screenshot to a cluster or creating a new cluster, clustering module 284 may append an indication of the screenshots to the third layer of the cluster.

Clustering module 284 may determine a similarity score between each of screenshots 264 and each of clusters 290 in one or more ways. Clustering module 284 may determine a similarity score for one of screenshots 264 and one of clusters 290 by determining a maximum score between that screenshot and any screenshot included in the cluster. Clustering module 284 may determine a similarity score for one of screenshots 264 and one of clusters 290 by determining a minimum score between that screenshot and any screenshot included in the cluster. Clustering module 284 may determine a similarity score for one of screenshots 264 and one of clusters 290 by determining an average score between that screenshot and all the screenshots included in the cluster.

To determine a maximum score between a particular screenshot and any screenshot included in a cluster, clustering module 284 may determine, based on an element identifier of each screenshot in the cluster, which screenshot included in the cluster has the most GUI elements (e.g., as indicated by the element identifier of that screenshot) in common with the particular screenshot. Clustering module 284 may determine a percentage of screen area occupied by the uncommon elements in the particular screenshot, and if the percentage of screen area that is occupied by the uncommon elements is less than an area threshold, clustering module 284 may apply a similarity function to the element identifiers of the two screenshots. Otherwise, if the percentage of screen area that is occupied by the uncommon elements is not less than the area threshold, clustering module 284 may determine that the particular screenshot is not compatible with the cluster.

In some examples, clustering module 284 may use a similarity function to determine a similarity score for a particular screenshot and a screenshot included in a cluster as defined by EQ. 1:

$$sim(A \cdot B) = [(2*|A \cap B|) - |A-B| - |B-A|)]/(|A|+|B|) \qquad \text{EQ. 1}$$

In equation 1, where A and B are sets of unique elements as defined by element identifiers of two different screenshots 264. EQ. 1 may return a positive one if A and B are identical, a negative one if A and B have no common elements, and a value greater than zero and less than positive one if A and B share some common elements. If the value returned from EQ. 1 (also referred to as a similarity score) is greater than a similarity threshold (e.g., 0.5), clustering module 284 may determine that the two screenshots are similar. For instance, if $|A|=10$, $|A \text{ intersect } B|=5$, and $|B|=5$, then sim (A, B)=$(2*5-5-0)/(10+5)=\frac{1}{3}=0.33$ and therefore A and B may be similar (e.g., if the similarity threshold is less than 0.33) or may not be similar (e.g., if the similarity threshold is 0.5 or some other value greater than 0.33). If $|A|=10$, $|A \text{ intersect } B|=10$, and $|B|=10$, then sim(A, B)=$(2*10-0-0)/(10+10)=20/20=1$ and therefore A and B may be identical. And if $|A|=5$, $|A \text{ intersect } B|=0$, and $|B|=5$, then sim(A, B)=$(2*0-5-5)/(5+5)=-10/10=-1$ and therefore A and B may have no elements in common.

Figure 3:
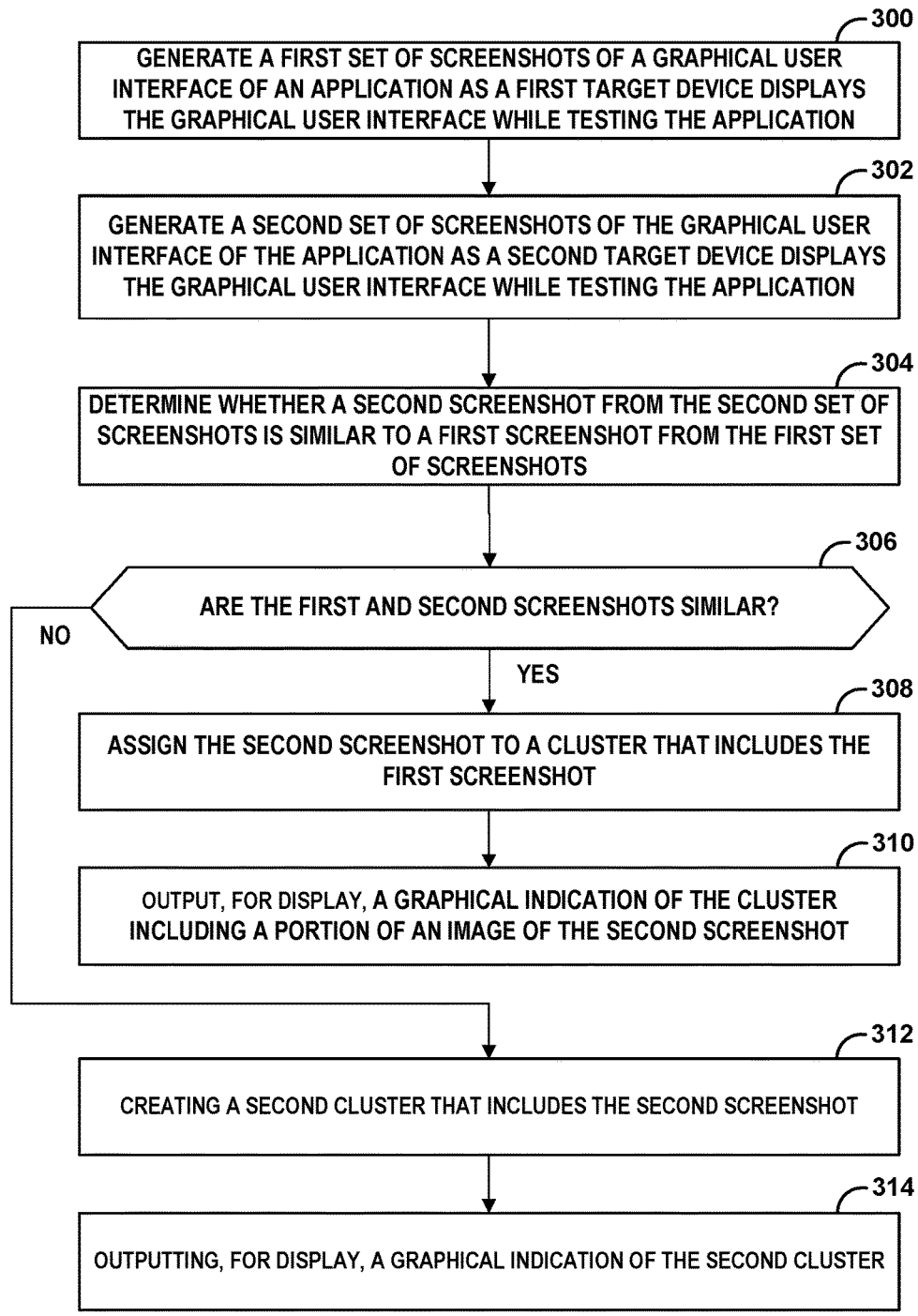
FIG. 3 is a flowchart illustrating example operations performed by an example computing system configured to identify and cluster similar screenshots generated during an application test, in accordance with one or more aspects of the present disclosure.

FIG. 3 is a flowchart illustrating example operations performed by an example computing system configured to identify and cluster similar screenshots generated during an application test, in accordance with one or more aspects of the present disclosure. Operations 400-440 may be performed by an application test system, such as ATS 160, ATS 260, computing device 110, or a combination thereof. For ease of description, FIG. 3 is described in the context of ATS 260 of FIG. 2.

As shown in FIG. 3, in operation, ATS 260 may generate, in response to a first test of an application, a first set of screenshots of a graphical user interface of the application while the graphical user interface is displayed by a first target device during the first test (300) and may generate, in response to a second test of the application, a second set of screenshots of the graphical user interface while the graphical user interface is displayed by a second target device during the second test (302). For example, test module 282 may configure, and cause, target devices 266A and 266N to execute application package 222 to conduct simultaneous tests. During, or in response to the simultaneous tests, target devices 266A and 266N may store test results 268 at storage component 276.

Target devices 266A and 266N may store screenshots 264 as part of test results 268 at storage component 276. For instance, target device 266A may store a first set of screenshots 264 and target devices 266N may store a second set of screenshots 264. Each screenshot from the first set of screenshots and each screenshot from the second set of screenshots include image data 286 (e.g., an image of the graphical user interface of application package 222) and metadata 288 indicative of one or more elements of the graphical user interface that are present in image data 286.

ATS 260 may determine, based on the metadata of a first screenshot from the first set of screenshots and the metadata of a second screenshot from the second set of screenshots, whether the second screenshot and the first screenshot are similar (304). For example, clustering module 284 may generate element identifiers for each of the first and second screenshots. Clustering module 284 may initially create a new cluster 290 that includes an indication of the first screenshot. Then, clustering module 284 may compare the element identifiers of the first screenshot and the second screenshot to determine whether the amount of screen area covered by the graphical elements in each of the two screenshots is greater than or less than an area threshold. In response to determining that the amount of screen area is less than the area threshold, clustering module 284 may determine a similarity score between the two screenshots. In response to determining that the amount of area is greater than or equal to the area threshold, clustering module 284 may create a new cluster that includes the second screenshot.

Responsive to determining that the first and second screenshots are similar (306, YES), ATS 260 may assign the second screenshot to a cluster that includes the first screenshot (308), and output, for display, a graphical indication of the cluster including a portion of the image of the second screenshot (310). For example, clustering module 284 may include an indication of the second screenshot in the cluster that includes the first screenshot so that when UI module 280 causes a graphical indication of the clusters to be displayed (e.g., as part of a graphical user interface of a service accessed by a client computing device such as computing device 110), the graphical indication of the cluster that includes the first screenshot may includes at least a portion of the image of the second screenshot.

In some examples, a cluster may include screenshots taken at one or more target devices, a first layer of the cluster includes an indication of a single screenshot included in the cluster that represents the cluster, a second layer of the cluster includes an indication of a respective screenshot included in the cluster that was taken at each of the one or more target devices, and a third layer of the cluster includes an indication of each screenshot that is included in the cluster. In such a case, ATS 260 may output the graphical indication of the cluster by at least outputting an image of the single screenshot included in the cluster that represents the cluster. For example, in addition to, the portion of the image of the second screenshot, UI module 280 may cause the graphical indication of the cluster that includes the first screenshot to include an image of a single representative screenshot of the cluster. The single representative screenshot may be the first screenshot, the second screenshot, or some other screenshot in the cluster.

Responsive to determining that the first and second screenshots are not similar (306, NO), ATS 260 may create a new cluster that includes the second screenshot (312), and may output, for display, a graphical indication of the second cluster. The graphical indication of the second cluster may include the portion of the image of the second screenshot, the graphical indication of the second cluster may be different than the graphical indication of the first cluster, and the second cluster may be different than the first cluster. For example, clustering module 284 may create a new cluster that includes an indication of the second screenshot so that when UI module 280 causes a graphical indication of the clusters to be displayed (e.g., as part of a graphical user interface of a service accessed by a client computing device such as computing device 110), the graphical indication of the new cluster that includes the second screenshot may includes at least a portion of the image of the second screenshot.

In some examples, ATS 260 may identify, based on metadata of two or more screenshots includes in the cluster, a discrepancy between respective images of the two or more screenshots included in the cluster, and may output, for display, a graphical indication of the discrepancy. In other words, developer service module 262 of ATS 260 may perform additional analysis of the screenshots in each of clusters 290 to determine whether any issues, abnormalities, or other information can be gleamed from metadata 268.

In some examples, developer service module 262 may detect overlay issues from analyzing metadata of screenshots in a cluster. From the metadata, developer service module 262 may detect if a child GUI element is out of bound or in other words, if child element's surface area is out of a parent element's bounds.

In some examples, developer service module 262 may detect when new translations of text contained within UI elements that were previously supported (e.g., in a previous version of an application) are no longer supported by a current application being tested. UI module 280 may output a notification that the new version of the application misses translations that an older version of the application supported. Developer service module 262 may identify UI element text in metadata of screenshots taken during a test of the older version that is different than UI element text in corresponding metadata of screenshots taken during a test of the current version.

In some examples, developer service module 262 may detect when the same screen on two different versions of the application is not rendering the same way. For example, by having screenshot clusters and corresponding metadata, developer service module 262 can look at the current and previous application version and compare the same key screens in order to identify any UI changes between versions. UI module 280 may output, for display a graphical indication or other notification of the UI changes.

In some examples, developer service module 262 may determine when an application includes a new feature or new screens (i.e., a "key screen") being introduced in a latest application version on one of the new screenshots. For example, by having screenshot clusters and corresponding metadata, developer service module 262 can look at the current and previous application version and compare the same key screens in order to identify if there was a new element added in a new application version on a section found previously or if there was a new screen (and possibly new feature) introduced in the new version. UI module 280 may output, for display a graphical indication or other notification of the new feature and/or new screen.

In some examples, developer service module 262 may perform pixel by pixel comparisons of screenshots in a cluster to determine whether any particular target device configurations that do not scale the design well to match a golden design—that is, a reference master image supplied by the software author as a known-good comparison point. UI module 280 may output, for display a graphical indication or other notification of any misalignments.

Clause 1. A method comprising: generating, in response to a first test of an application, a first set of screenshots of a graphical user interface of the application while the graphical user interface is displayed by a first target device during the first test; generating, in response to a second test of the application, a second set of screenshots of the graphical user interface while the graphical user interface is displayed by a second target device during the second test, wherein each screenshot from the second set of screenshots includes a respective image of the graphical user interface and respective metadata indicative of at least one of one or more elements of the graphical user interface that are present in the respective image or a state of the application or respective target device when the respective image is made; determining, based on the respective metadata of a screenshot from the first set of screenshots and the respective metadata of a screenshot from the second set of screenshots, a similarity score indicative of an amount of similarity between the screenshot from the first set of screenshots and the screenshot from the second set of screenshots; determining whether the similarity score satisfies a similarity threshold; and responsive to determining that the similarity score satisfies the similarity threshold: assigning the screenshot from the second set of screenshots to a cluster that includes the screenshot from the first set of screenshots; and outputting, for display, a graphical indication of the cluster including a portion of the respective image of the screenshot from the second set of screenshots.

Clause 2. The method of clause 1, wherein the cluster is a first cluster, wherein the similarity score is a first similarity score, wherein the screenshot from the first set of screenshots is a first screenshot from the first set of screenshots, and wherein the screenshot from the second set of screenshots is a first screenshot from the second set of screenshots, the method further comprising: determining, based on the respective metadata of a second screenshot from the first set of screenshots and the respective metadata of a second screenshot from the second set of screenshots, a second similarity score indicative of an amount of similarity between the second screenshot from the first set of screenshots and the second screenshot from the second set of screenshots; determining whether the second similarity score satisfies the similarity threshold; responsive to determining that the second similarity score does not satisfy the similarity threshold: creating a second cluster that includes the second screenshot from the second set of screenshots; and outputting, for display, a graphical indication of the second cluster, wherein: the graphical indication of the second cluster includes a portion of the respective image of the second screenshot from the second set of screenshots; the graphical indication of the second cluster is different than the graphical indication of the first cluster; and the second cluster is different than the first cluster.

Clause 3. The method of any one of clauses 1-2, further comprising: determining, based on the respective metadata of the screenshot from the first set of screenshots, an element identifier for the screenshot from the first set of screenshots; determining, based on the respective metadata of the screenshot from the second set of screenshots, an element identifier of the screenshot from the first set of screenshots; and determining, based on the element identifier for the screenshot from the first set of screenshots and the element identifier for the screenshot from the second set of screenshots, the similarity score indicative of the amount of similarity between the screenshot from the first set of screenshots and the screenshot from the second set of screenshots.

Clause 4. The method of clause 3, wherein: determining the element identifier for the screenshot from the first set of screenshots comprises mapping each layer in a sequence defined by the respective metadata of the screenshot from the first set of screenshots with a corresponding resource id and class name of a particular element from the one or more graphical elements that are present in the respective image of the screenshot from the first set of screenshots; and determining the element identifier for the screenshot from the second set of screenshots comprises mapping each layer in a sequence defined by the respective metadata of the screenshot from the second set of screenshots with a corresponding resource id and class name of a particular element from the one or more graphical elements that are present in the respective image of the screenshot from the second set of screenshots.

Clause 5. The method of any one of clauses 1-4, wherein the screenshot from the second set of screenshots is a first screenshot from the second set of screenshots, wherein the similarity score is a first similarity score, and wherein determining the first similarity score comprises: determining, based on the respective metadata of the screenshot from the first set of screenshots and the respective metadata of each screenshot from the second set of screenshots, a respective similarity score for each screenshot from the second set of screenshots, each respective similarity score for a particular screenshot from the second set of screenshots being indicative of an amount of similarity between the screenshot from the first set of screenshots and the particular screenshot from the second set of screenshots, wherein: the first similarity score corresponds to a maximum score from among all the respective similarity scores for the screenshots from the second set of screenshots; and the first screenshot from the second set of screenshots is the particular screenshot associated with the maximum score.

Clause 6. The method of any one of clauses 1-5, wherein: the cluster includes one or more screenshots taken at one or more target devices; a first layer of the cluster includes an indication of a single screenshot from the one or more screenshots that represents the cluster; a second layer of the cluster includes an indication of a respective screenshot from the one or more screenshots that was taken at each of the one or more target devices; and a third layer of the cluster includes an indication of each screenshot from the one or more screenshots that is included in the cluster.

Clause 7. The method of clause 6, wherein outputting the graphical indication of the cluster comprises outputting an image of the single screenshot from the one or more screenshots that represents the cluster.

Clause 8. The method of any one of clauses 1-7, further comprising: identifying, based on respective metadata of two or more screenshots included in the cluster, a discrepancy between the respective images of the two or more screenshots included in the cluster; and outputting an indication of the discrepancy.

Clause 9. A computing system comprising: at least one processor configured to: receive a request to test an application; generate, in response to a first test of the application following the request, a first set of screenshots of a graphical user interface of the application while the graphical user interface is displayed by a first target device during the first test; generate, in response to a second test of the application following the request, a second set of screenshots of the graphical user interface while the graphical user interface is displayed by a second target device during the second test, wherein each screenshot from the first set of screenshots and each screenshot from the second set of screenshots includes a respective image of the graphical user interface and respective metadata indicative of at least one of one or more elements of the graphical user interface that are present in the respective image or a state of the application or respective target device when the respective image is made; determine, based on the respective metadata of a screenshot from the first set of screenshots and the respective metadata of a screenshot from the second set of screenshots, a similarity score indicative of an amount of similarity between the screenshot from the first set of screenshots and the screenshot from the second set of screenshots; determine whether the similarity score satisfies a similarity threshold; and responsive to determining that the similarity score satisfies the similarity threshold: assign the screenshot from the second set of screenshots to a cluster that includes the screenshot from the first set of screenshots; and output, for display, a graphical indication of the cluster including a portion of the respective image of the screenshot from the second set of screenshots.

Clause 10. The computing system of clause 9, wherein the cluster is a first cluster, wherein the similarity score is a first similarity score, wherein the screenshot from the first set of screenshots is a first screenshot from the first set of screenshots, and wherein the screenshot from the second set of screenshots is a first screenshot from the second set of screenshots, the at least one processor is further configured to: determine, based on the respective metadata of a second screenshot from the first set of screenshots and the respective metadata of a second screenshot from the second set of screenshots, a second similarity score indicative of an amount of similarity between the second screenshot from the first set of screenshots and the second screenshot from the second set of screenshots; determine whether the second similarity score satisfies the similarity threshold; responsive to determining that the second similarity score does not satisfy the similarity threshold: create a second cluster that includes the second screenshot from the second set of screenshots; and output, for display, a graphical indication of the second cluster, wherein: the graphical indication of the second cluster includes a portion of the respective image of the second screenshot from the second set of screenshots; the graphical indication of the second cluster is different than the graphical indication of the first cluster; and the second cluster is different than the first cluster.

Clause 11. The computing system of any one of clauses 9-10, wherein the first target device is different than the second target device and the computing system comprises the first target device and the second target device.

Clause 12. The computing system of any one of clauses 9-11, wherein the graphical indication of the cluster is output for display as part of a graphical user interface of a service accessed by a client computing device.

Clause 13. The computing system of any one of clauses 9-12, wherein the first target device and the second target device are a single target device, and wherein the first set of screenshots and the second set of screenshots are a single set of screenshots.

Clause 14. A computer-readable storage medium comprising instructions that, when executed, cause at least one processor of a computing system to: generate, in response to a first test of an application, a first set of screenshots of a graphical user interface of the application while the graphical user interface is displayed by a first target device during the first test; generate, in response to a second test of the application, a second set of screenshots of the graphical user interface while the graphical user interface is displayed by a second target device during the second test, wherein each screenshot from the first set of screenshots and each screenshot from the second set of screenshots includes a respective image of the graphical user interface and respective metadata indicative of at least one of one or more elements of the graphical user interface that are present in the respective image or a state of the application or respective target device when the respective image is made; determine, based on the respective metadata of a screenshot from the first set of screenshots and the respective metadata of a screenshot from the second set of screenshots, a similarity score indicative of an amount of similarity between the screenshot from the first set of screenshots and the screenshot from the second set of screenshots; determine whether the similarity score satisfies a similarity threshold; and responsive to determining that the similarity score satisfies the similarity threshold: assign the screenshot from the second set of screenshots to a cluster that includes the screenshot from the first set of screenshots; and output, for display, a graphical indication of the cluster including a portion of the respective image of the screenshot from the second set of screenshots.

Clause 15. The computer-readable storage medium of clause 14, wherein the cluster is a first cluster, wherein the similarity score is a first similarity score, wherein the screenshot from the first set of screenshots is a first screenshot from the first set of screenshots, and wherein the screenshot from the second set of screenshots is a first screenshot from the second set of screenshots, and the instructions, when executed, further cause the at least one processor to: determine, based on the respective metadata of a second screenshot from the first set of screenshots and the respective metadata of a second screenshot from the second set of screenshots, a second similarity score indicative of an amount of similarity between the second screenshot from the first set of screenshots and the second screenshot from the second set of screenshots; determine whether the second similarity score satisfies the similarity threshold; responsive to determining that the second similarity score does not satisfy the similarity threshold: create a second cluster that includes the second screenshot from the second set of screenshots; and output, for display, a graphical indication of the second cluster, wherein: the graphical indication of the second cluster includes a portion of the respective image of the second screenshot from the second set of screenshots; the graphical indication of the second cluster is different than the graphical indication of the first cluster; and the second cluster is different than the first cluster.

Clause 16. The computer-readable storage medium of any one of clauses 14-15, wherein the instructions, when executed, further cause the at least one processor to: determine, based on the respective metadata of the screenshot from the first set of screenshots, an element identifier for the screenshot from the first set of screenshots; determine, based on the respective metadata of the screenshot from the second set of screenshots, an element identifier of the screenshot from the first set of screenshots; and determine, based on the element identifier for the screen shot from the first set of screenshots and the element identifier for the screenshot from the second set of screenshots, the similarity score indicative of the amount of similarity between the screenshot from the first set of screenshots and the screenshot from the second set of screenshots.

Clause 17. The computer-readable storage medium of clause 16, wherein the instructions, when executed, further cause the at least one processor to: determine the element identifier for the screenshot from the first set of screenshots by at least mapping each layer in a sequence defined by the respective metadata of the screenshot from the first set of screenshots with a corresponding resource id and class name of a particular element from the one or more graphical elements that are present in the respective image of the screenshot from the first set of screenshots; and determine the element identifier for the screenshot from the second set of screenshots by at least mapping each layer in a sequence defined by the respective metadata of the screenshot from the second set of screenshots with a corresponding resource id and class name of a particular element from the one or more graphical elements that are present in the respective image of the screenshot from the second set of screenshots.

Clause 18. The computer-readable storage medium of clause 16, wherein the screenshot from the second set of screenshots is a first screenshot from the second set of screenshots, wherein the similarity score is a first similarity score, and wherein the instructions, when executed, further cause the at least one processor to determine the first similarity by at least: determining, based on the respective metadata of the screenshot from the first set of screenshots and the respective metadata of each screenshot from the second set of screenshots, a respective similarity score for each screenshot from the second set of screenshots, each respective similarity score for a particular screenshot from the second set of screenshots being indicative of an amount of similarity between the screenshot from the first set of screenshots and the particular screenshot from the second set of screenshots, wherein: the first similarity score corresponds to a maximum score from among all the respective similarity scores for the screenshots from the second set of screenshots; and the first screenshot from the second set of screenshots is the particular screenshot associated with the maximum score.

Clause 19. The computer-readable storage medium of any one of clauses 14-18, wherein: the cluster includes one or more screenshots taken at one or more target devices; a first layer of the cluster includes an indication of a single screenshot from the one or more screenshots that represents the cluster; a second layer of the cluster includes an indication of a respective screenshot from the one or more screenshots that was taken at each of the one or more target devices, and a third layer of the cluster includes an indication of each screenshot from the one or more screenshots that is included in the cluster.

Clause 20. The computer-readable storage medium of clause 19, wherein the instructions, when executed, further cause the at least one processor to responsive to determining that the similarity score satisfies the similarity threshold, output, to a different system used in evaluating the application, an indication of the cluster.

Clause 21. A system including means for performing any of the methods of clauses 1-8.

Clause 22. A computing system including at least one processor configured to perform any of the methods of clauses 1-8.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method for automatic structural analysis of application screenshots, the method comprising:
   determining, by a computing system, whether elemental structures defined in non-pixel information of a screenshot from a first set of screenshots are similar to elemental structures defined in non-pixel information of the screenshot from the second set of screenshots, wherein the first set of screenshots was generated in response to a first test of an application and the second set of screenshots was generated in response to a second test of the application, and wherein the non-pixel information represents information indicative of the elemental structures that make up a graphical user interface and includes an element identifier formed based on one or more of a class name, a resource identifier, and a sequence associated with one or more of the elemental structures; and responsive to determining that the elemental structures defined in the non-pixel information of the screenshot from the first set of screenshots are similar to the elemental structures defined in the non-pixel information of the screenshot from the second set of screenshots:

assigning, by the computing system, the screen shot from the first set of screen shots and the screen shot from the second set of screen shots to a cluster of screenshots that share similar elemental structures as defined by respective non-pixel information of each of the screenshots; and outputting, by the computing system, for display, a graphical indication of the cluster.

2. The method of claim 1, wherein the screenshot from the first set of screen shots includes a respective image and the non-pixel information of the screenshot from the first set of screen shots includes respective metadata of the screenshot from the first set of screen shots, and wherein the screenshot from the second set of screen shots includes a respective image and the non-pixel information of the screenshot from the second set of screen shots includes respective metadata of the screenshot from the second set of screen shots.

3. The method of claim 1, further comprising:
executing the first test of the application at a first target device; and
executing the second test of the application at a second target device that is different than the first target device.

4. The method of claim 3, wherein the first target device and the second target device differ in at least one of: respective hardware configurations, respective software configurations, or respective firmware configurations.

5. The method of claim 1, wherein each screenshot from the cluster includes a respective image with at least one similar graphical user interface element as each other screenshot from the cluster.

6. The method of claim 1, wherein at least one screenshot from the cluster includes a respective image with at least one dissimilar graphical user interface element as at least one other screenshot from the cluster.

7. The method of claim 1, wherein:
the cluster includes one or more screenshots taken at one or more target devices;
a first layer of the cluster includes an indication of a single screenshot from the one or more screenshots that represents the cluster;
a second layer of the cluster includes an indication of a respective screenshot from the one or more screenshots that was taken at each of the one or more target devices;
a third layer of the cluster includes an indication of each screenshot from the one or more screenshots that is included in the cluster; and outputting the graphical indication of the cluster comprises outputting an image of the single screenshot from the one or more screenshots that represents the cluster.

8. The method of claim 1, wherein the screen shot from the first set of screen shots is already assigned to the cluster when the computing system assigns the screen shot from the second set of screen shots to the cluster, and wherein determining whether elemental structures defined in the non-pixel information of the screenshot from the first set of screenshots are similar to elemental structures defined in the non-pixel information of the screenshot from the second set of screenshots comprises determining a similarity score between the screenshot from the first set of screenshots and the screenshot from the second set of screenshots.

9. The method of claim 8, wherein the similarity score comprises a maximum score between the screenshot from the second set of screenshots and any screenshot included in the cluster.

10. The method of claim 8, wherein the similarity score comprises a minimum score between the screenshot from the second set of screenshots and any screenshot included in the cluster.

11. The method of claim 8, wherein the similarity score comprises an average score between the screenshot from the second set of screenshots and all screenshots included in the cluster.

12. A computing system configured to perform automatic structural analysis of application screenshots comprising:
at least one processor configured to:
determine whether elemental structures defined in non-pixel information of a screenshot from a first set of screenshots are similar to elemental structures defined in non-pixel information of a screenshot from second set of screenshots, wherein the first set of screenshots was generated in response to a first test of an application and the second set of screenshots was generated in response to a second test of the application, and wherein the non-pixel information represents information indicative of the elemental structures that make up a graphical user interface and includes an element identifier formed based on one or more of a class name, a resource identifier, and a sequence associated with one or more of the elemental structures; and responsive to determining that the elemental structures defined in the non-pixel information of the screenshot from the first set of screenshots are similar to the elemental structures defined in the non-pixel information of the screenshot from the second set of screenshots:

assign the screen shot from the first set of screen shots and the screen shot from the second set of screen shots to a cluster of screenshots that share similar elemental structures as defined by respective non-pixel information of each of the screenshots; and output, for display at a client device, a graphical indication of the cluster.

13. The computing system of claim 12, wherein the graphical indication of the cluster is output for display as part of a graphical user interface of an application test service being accessed by a client computing device.

14. The computing system of claim 12, wherein the first target device and the second target device are a single target device, and wherein the first set of screenshots and the second set of screenshots are a single set of screenshots accessed by a client computing device.

15. The computing system of claim 12, wherein the screenshot from the first set of screen shots includes a respective image and the non-pixel information of the screenshot from the first set of screen shots includes respective metadata of the screenshot from the first set of screen shots, and wherein the screenshot from the second set of screen shots includes a respective image and the non-pixel information of the screenshot from the second set of screen shots includes respective metadata of the screenshot from the second set of screen shots.

16. The computing system of claim 12, further comprising a first target device and a second target device, wherein the at least one processor is further configured to:
   execute the first test of the application at the first target device; and
   execute the second test of the application at the second target device that is different than the first target device.

17. The computing system of claim 16, wherein the first target device and the second target device differ in at least one of: respective hardware configurations, respective software configurations, or respective firmware configurations.

18. A non-transitory computer-readable storage medium comprising instructions that, when executed, cause at least one processor of a computing system that is configured to perform automatic structural analysis of application screenshots to:
   determine whether elemental structures defined in non-pixel information of a screenshot from a first set of screenshots are similar to elemental structures defined in non-pixel information of a screenshot from second set of screenshots, wherein the first set of screenshots was generated in response to a first test of an application and the second set of screenshots was generated in response to a second test of the application, and wherein the non-pixel information represents information indicative of the elemental structures that make up a graphical user interface and includes an element identifier formed based on one or more of a class name, a resource identifier, and a sequence associated with one or more of the elemental structures; and
   responsive to determining that the elemental structures defined in the non-pixel information of the screenshot from the first set of screenshots are similar to the elemental structures defined in the non-pixel information of the screenshot from the second set of screenshots:
      assign the screen shot from the first set of screen shots and the screen shot from the second set of screen shots to a cluster of screenshots that share similar elemental structures as defined by respective non-pixel information of each of the screenshots; and
      output, for display at a client device, a graphical indication of the cluster.

19. The computer-readable storage medium of claim 18, wherein the screen shot from the first set of screen shots is already assigned to the cluster when the computing system assigns the screen shot from the second set of screen shots to the cluster, and wherein the instructions, when executed, further cause the at least one processor to determine whether elemental structures defined in the non-pixel information of the screenshot from the first set of screenshots are similar to elemental structures defined in the non-pixel information of the screenshot from the second set of screenshots by at least determining a similarity score between the screenshot from the first set of screenshots and the screenshot from the second set of screenshots.

20. The computer-readable storage medium of claim 18, wherein at least one of:
   the similarity score comprises a maximum score between the screenshot from the second set of screenshots and any screenshot included in the cluster;
   the similarity score comprises a minimum score between the screenshot from the second set of screenshots and any screenshot included in the cluster; or
   the similarity score comprises an average score between the screenshot from the second set of screenshots and all screenshots included in the cluster.

* * * * *